(12) United States Patent
Sen et al.

(10) Patent No.: US 8,948,754 B2
(45) Date of Patent: Feb. 3, 2015

(54) METHOD AND APPARATUS FOR ESTABLISHING A COMMUNICATION CONNECTION

(75) Inventors: Abhishek Sen, San Jose, CA (US); Shivesh Makharia, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/551,460

(22) Filed: Jul. 17, 2012

(65) Prior Publication Data

US 2014/0024370 A1 Jan. 23, 2014

(51) Int. Cl.
*H04W 4/00* (2009.01)

(52) U.S. Cl.
USPC ............... 455/435.1; 455/435.2; 455/436; 455/437; 455/453

(58) Field of Classification Search
USPC .............................. 455/435.1–453
See application file for complete search history.

(56) References Cited

U.S. PATENT DOCUMENTS

| | | | |
|---|---|---|---|
| 6,387,027 B1 * | 5/2002 | Bodin | 455/419 |
| 8,018,909 B2 * | 9/2011 | Ahlen et al. | 370/338 |
| 2005/0059396 A1 * | 3/2005 | Chuah et al. | 455/435.1 |
| 2008/0102839 A1 * | 5/2008 | Kurokawa | 455/439 |
| 2010/0081435 A1 * | 4/2010 | Huang | 455/435.1 |
| 2012/0077456 A1 * | 3/2012 | Tiwari | 455/404.1 |

OTHER PUBLICATIONS

"Introduction to Evolved Packet Core", Alcatel-lucent, Strategic White Paper.
"LTE Frequently Asked Questions", LteWorld, http://lteworld.org/faq.
"ETSI TS 124 301 V10.6.1 (Mar. 2012) Technical Specification", Universal Mobile Telecommunications System (UMTS); LTE; Non-Access-Stratum (NAS) protocol for Evolved Packet System (EPS); Stage 3, 3GPP TS 24.301 ver. 10.6.1, Release 10.
"The LTE Network Architecture A Comprehensive Tutorial", Alcatel-Lucent, Strategic White Paper.

* cited by examiner

*Primary Examiner* — Charles Appiah
*Assistant Examiner* — Jaime Holliday
(74) *Attorney, Agent, or Firm* — Park, Vaughan, Fleming & Dowler LLP

(57) ABSTRACT

Method and apparatus for establishing a connection between a device (e.g., a mobile device such as a telephone or tablet) and a communication network (e.g., a telephone/data service provider's network). The communication network may adhere to a mobile communication standard such as 3GPP ($3^{rd}$ Generation Partnership Project) LTE (Long Term Evolution). When the user device attempts a connection to a default access point name or APN (e.g., via an Attach Request message), and that access point is unavailable, instead of rejecting the request (e.g., with an Attach Reject message) the communication network identifies an access point that is available and returns an Attach Accept message that identifies the available access point. After the connection is established, if the default access point becomes available, the network may subsequently detach the user device from the network, but specify that the device should re-attach (to the default access point).

18 Claims, 4 Drawing Sheets

METHOD AND APPARATUS FOR ESTABLISHING A COMMUNICATION CONNECTION

BACKGROUND

This invention relates to the field of communications. More particularly, methods and apparatus are provided for establishing a communication connection between a device and a communication network.

The $3^{rd}$ Generation Partnership Project (3GPP™) is a collaboration among several telecommunications standards bodies to provide standards for mobile communications, particularly for GSM (Global System for Mobile communication) networks and devices. Some of the specifications issued by 3GPP include GPRS (General Packet Radio Service), EDGE (Enhanced Data rates for GSM Evolution), W-CDMA (Wideband Code Division Multiple Access) and LTE™ (Long Term Evolution).

LTE is a standard for wireless communication designed to provide high-speed data access for mobile telephones and other devices (e.g., tablet computers). LTE implements a flat IP (Internet Protocol) architecture to provide lower latency compared to earlier (e.g., 2G and 3G) architectures. Therefore, all communication services, including voice and data, are carried by IP, although it provides fall-back capability to circuit-switched technology for voice connections, and is interoperable with previous generations of mobile communication technology.

Among its benefits, LTE supports both frequency-division duplexing (FDD) and time-division duplexing (TDD), allows different quality of service (QoS) characteristics for different communication channels/connections, and supports scalable bandwidth allocations. Although initially implemented only on GSM and UMTS™ (Universal Mobile Telecommunications System) networks, CDMA (Code Division Multiple Access) network operators are also migrating to the LTE architecture. LTE Advanced has been proposed and is in development as an enhancement to the LTE standard, and will provide even higher data rates and support more users per cell.

The LTE specification provides for two states of user equipment relative to the LTE network and the Evolved Packet System (EPS): EMM_DEREGISTERED and EMM_REGISTERED, where EMM stands for EPS Mobility Management. In the EMM_DEREGISTERED state, user equipment has no active signaling connection with the network (e.g., it is camped or turned off), and therefore has no immediate access to packet services through the EPS; in the EMM_REGISTERED state, it does. Transition to the EMM_REGISTERED state, however, may require several messages to be exchanged between the equipment and the network, especially if one or more default access points are unavailable. The more signaling and processing required to enter the EMM_REGISTERED state, the more delay there is in establishing a connection and the user's access to the Internet and/or other data services.

The LTE architecture envisions a radio access network (or RAN), comprising evolved nodeBs that communicate directly with user equipment, and a core network that manages user connections. A user's connection context may be purged from the access network when his or her equipment is in the EMM_DEREGISTERED state, and so the faster the equipment can be returned to the EMM_REGISTERED state, the sooner a communication channel can be established through the access network (i.e., a radio bearer) and the sooner full functionality can be returned to the user.

SUMMARY

In some embodiments of the invention, methods and apparatus are provided for facilitating communication between a device (e.g., user equipment) and a network (e.g., an evolved packet system core network), by transitioning the device from the EMM_DEREGISTERED state (or a comparable state) to the EMM_REGISTERED state (or a comparable state) in a prompt manner, even when a default attachment point or entity is unavailable.

In illustrative embodiments, the device issues an Attach_Request message to request attachment to a specific access point in the network. The network determines the requested access point is unavailable.

Instead of returning an Attach_Reject message, the network responds with an Attach_Accept message that identifies a substitute access point. The device then attaches to the substitute access point.

In some embodiments of the invention, the network may later determine that the originally requested access point has become available, and may issue a Detach_Request message to the device to detach it. Subsequently, the device will issue a new Attach_Request to request attachment to that access point.

DETAILED DESCRIPTION

Figure 1:
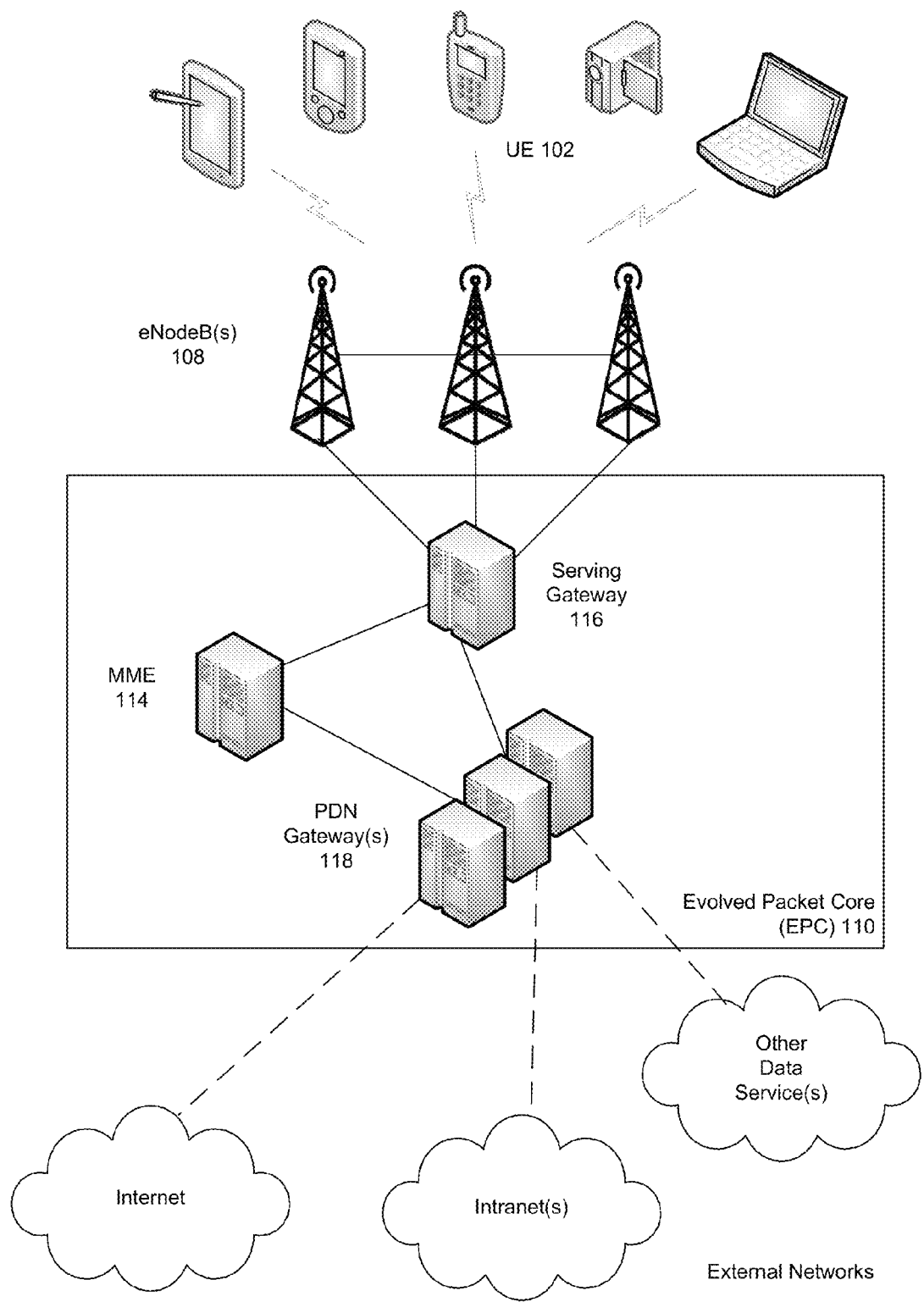
FIG. 1 is a block diagram depicting an LTE communication environment in accordance with some embodiments of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In embodiments of the invention described herein, methods and apparatus are provided for facilitating a communication attachment or connection between user equipment (e.g., a mobile communication device, a remote sensor or data terminal, unattended machinery, a recreational or amusement device) and a compatible communication network. Specific embodiments of the invention are described below as they may be implemented in environments comprising smart phones, tablets or other mobile devices communicating with GSM (Global System for Mobile communication), CDMA (Code Division Multiple Access) and/or other existing radio access networks (RAN), but other types of user equipment and communication networks may be involved in other embodiments of the invention.

The LTE™ (Long Term Evolution) specification promulgated by 3GPP™ (the $3^{rd}$ Generation Partnership Project) restricts user equipment (UE) to two signaling states with reference to the Evolved Packet System (EPS) network and the EMM (EPS Mobility Management): EMM_DEREGISTERED and EMM_REGISTERED. In the EMM_DEREGISTERED state, a UE has no signaling connection with or attachment to the EPS, and therefore has no immediate access to data or voice services (e.g., the UE is camped or powered off), but in the EMM_REGISTERED state, it does. A UE typically enters the EMM_REGISTERED state when it powers on or initiates a new data service connection.

To transition from the EMM_DEREGISTERED state to the EMM_REGISTERED state (e.g., in order to access a packet data network, such as the Internet, or a packet data service), the user equipment must send an Attach_Request message and identify an access point (APN or Access Point Name) to which the equipment wants to connect. The access point is a provider of packet data services, or an entry point in the network to a provider of such services.

The Attach_Request message also includes other information, such as the version of Internet Protocol (IP) the equipment is using (e.g., IPv4, IPv6, IPv4v6), the type of attachment requested (e.g., Initial, Handover) and so on, as specified in the EPS Mobility Management protocol. The target APN may be communicated within the Attach_Request message, or may be transmitted as part of another message from the UE.

The network may respond with an Attach_Accept message if the desired attachment to the specified access point is approved. The UE and the network then complete the attachment.

However, if the attach request is not approved, according to the LTE specification the network responds with an Attach_Reject message informing the UE that the desired connection to the requested access point was refused. UEs are normally programmed to attempt to attach to specific access points, but may always start a connection attempt with the same default access point. If the initial connection attempt is rejected, a new Attach_Request message is initiated for the same or for an alternative access point. Each time the UE's connection is rejected, it must start over with a new request.

Thus, according to the existing method of entering the EMM_REGISTERED state and enabling communication with and through the LTE EPC (Evolved Packet Core), the exchange of multiple messages between a UE and the MME (Mobility Management Entity) and/or other EPC component(s) may be required, including one or more failed attempts and subsequent restarts.

Therefore, in some embodiments of the invention, when the network MME or some other element of the EPC rejects an attach request to a particular access point from a UE, instead of returning an Attach_Reject message it selects a substitute access point, returns an Attach_Accept message and identifies the substitute access point to the UE. The UE proceeds to attach to and use the substitute access point. In these embodiments, the signaling required to establish a connection for the UE when its initial or default access point is unavailable is thus decreased and the process hastened.

FIG. 1 illustrates a communication environment in which one or more embodiments of the invention may be implemented. From the following description, other embodiments may be derived for operation with other device and network architectures than those discussed herein.

In FIG. 1, user equipment (UE) 102 may be a smart phone, a tablet computer, a laptop or other device or machinery equipped with a radio transceiver and configured to access an LTE network. In particular, UE 102 is configured to establish voice and/or data communications through Evolved Packet Core (EPC) 110. Illustratively, via EPC 110, UE 102 may access the Internet, a private intranet and/or other external packet data services. UE 102 communicates with EPC 110 via a radio access network that employs one or more of eNodeB 108.

An exemplary eNodeB 108 hosts physical (PHY), medium access control (MAC) and other protocol layers, such as radio link control (RLC) and packet data control (PDC). It performs several functions, which may include, but are not limited to: radio resource management, admission control, scheduling, enforcement of QoS, security (e.g., encryption and decryption), cell information broadcast and compression/decompression. One eNodeB may manage multiple communication cells.

EPC 110 includes several components, such as Mobility Management Entity (MME) 114, serving gateway 116 and one or more Packet Data Network (PDN) gateways 118. MME 114 manages user equipment contexts, including identities, states and security parameters, facilitates UE attachments and connections to and through the EPC, and authenticates users. It performs signaling and control functions to manage UE access to network connections, assignment of network resources, management of mobility states and/or other functions.

Serving gateway 116 routes data packets through the EPC and is the termination point for the packet data network interface toward the RAN (Radio Access Network) and user side. It provides a mobility anchor during handover of a UE connection as the UE moves from one eNodeB's service area to another.

PDN gateway 118 is the termination point of the packet data network interface on the services side of the EPC, and thus provides UEs with connectivity to external packet data networks and services (e.g., the Internet, an intranet), and acts as an anchor point for such sessions. A PDN gateway allocates IP addresses to UEs, allows one UE to have simultaneous connections with multiple external networks and/or services, and performs functions such as policy enforcement (e.g., to ensure proper QoS is provided), packet filtering and screening, etc.

UE 102 attaches to EPC 110 in order to establish a context within MME 114 and have a bearer established to PDN gateway 118 to allow the UE to access data services outside the evolved packet core. A bearer is a virtual container having a defined set of QoS characteristics. Each bearer may incorporate multiple virtual IP connections termed service data flows. Bearers are established, maintained and released within EPC 110 (e.g., by MME 114).

Some components of the evolved packet core (e.g., a home subscriber server, a policy and charging rules function) are omitted from FIG. 1 for the sake of clarity.

Figure 2:
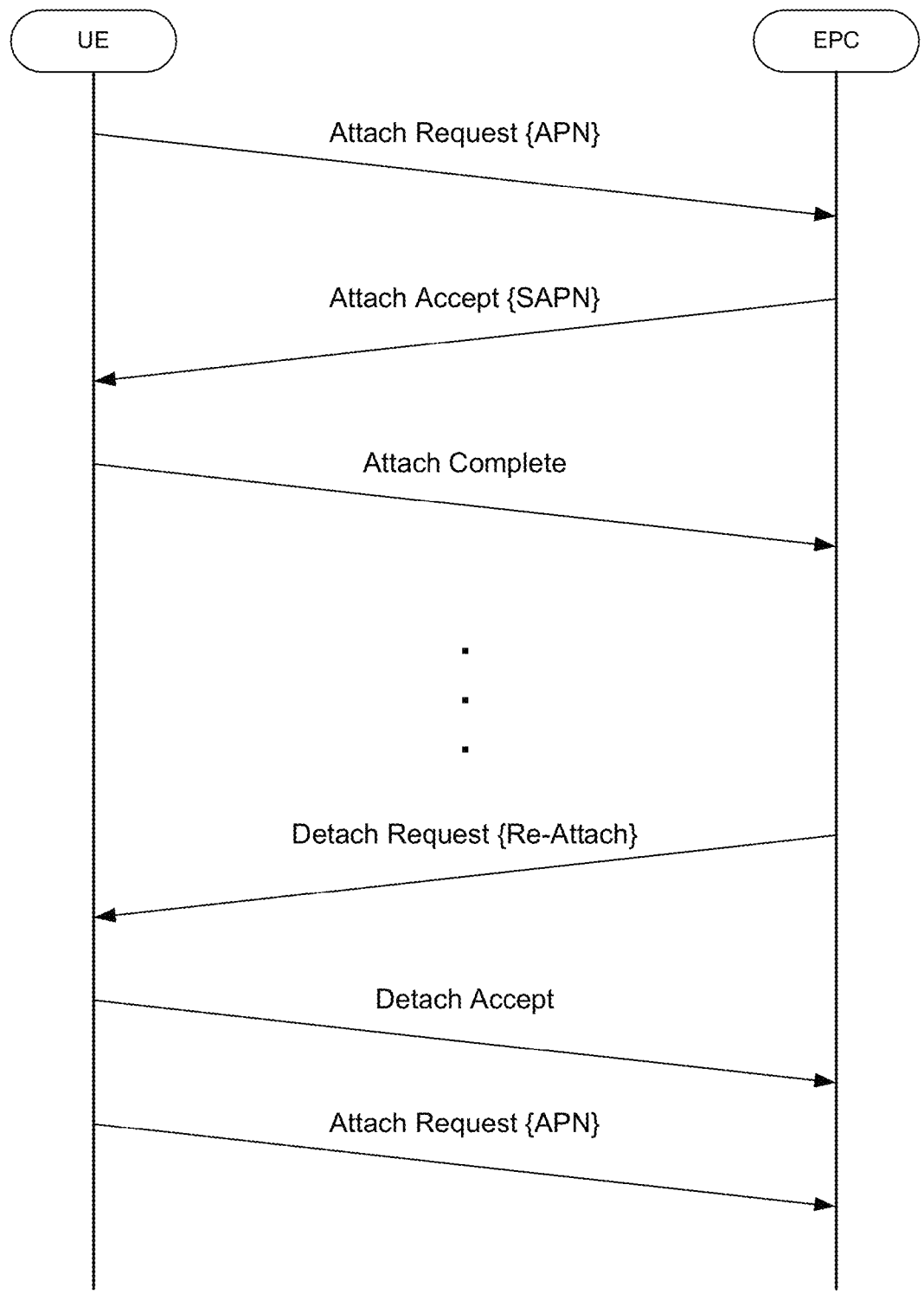
FIG. 2 is a diagram illustrating the exchange of messages between user equipment and an LTE network, in order to place the equipment in the EMM_REGISTERED state, in accordance with some embodiments of the invention.

FIG. 2 is a diagram demonstrating upper layer (e.g., layer 3) signaling conducted between UE 102 and EPC 110 (e.g., MME 114) to establish a connection for data and/or voice communications. Some signaling, handshaking, authentication and/or other information exchanges and processing are omitted from FIG. 2 in order to focus upon other aspects.

When the UE powers on or otherwise needs to transition from EMM_DEREGISTERED to EMM_REGISTERED, it issues an Attach_Request message with an APN (Access Point Name) identifying an access point to which it wants to connect. The attach request may also include other relevant information elements, such as IP type (e.g., IPv4, IPv6, IPv4v6), attachment type (e.g., initial, handover), etc.

An access point may be a particular gateway (e.g., a PDN gateway 118) to an external packet data network or service, or possibly to a specific application. Different access points may be configured to provide access to different services or types of services, and may provide different QoS to different connections, attachments or UEs. Each access point to which a UE attaches or is connected may provide the UE with an IP address to use to communicate with that access point.

In some embodiments, the APN is communicated as part of a different message, in particular, a PDN_Connectivity_Request message that accompanies the Attach_Request message, instead of being part of the Attach_Request message itself. In other embodiments of the invention, the UE sets a specific flag in the Attach_Request message (e.g., ESM_INFO_TRANSFER), and the MME will respond with an information request query to identify the desired access point.

Upon receipt of the Attach_Request message, the MME determines whether the UE can be connected to the desired access point. In embodiments of the invention discussed herein, it is determined that the desired connection cannot be established or approved, because the access point is offline, because it is not accessible to the UE (e.g., it doesn't provide appropriate quality of service or QoS, it is incompatible with a subscriber plan associated with the UE) or for some other reason.

However, instead of rejecting the attach request and forcing the UE to start over, the MME issues an Attach_Accept message that includes a substitute APN (SAPN) identifying a substitute access point to which the UE can attach. Alternatively, the SAPN may be transmitted in a different message.

In the illustrated process, the substitute access point is capable of providing the same or equivalent data service(s) offered by the UE's requested access point—which may be the default access point it requests every time it issues a first Attach_Request message.

In some embodiments of the invention, before or in conjunction with the Attach_Accept message, the EPC may authenticate the user or user equipment and/or the user equipment may authenticate the network.

The Attach_Accept message may provide other information as known in the EMM (EPS Mobility Management) protocol, such as a temporary identifier for the UE to use, an IP address for the UE, a list of features available through the EPC, etc. Thus, even though the UE's requested attachment is not possible, the MME responds with an acceptance message. The Attach_Accept message may be accompanied by an Activate_Default_EPS_Bearer_Context_Request message and/or other messages related to the attachment.

In some embodiments of the invention, the network's Attach_Accept message may include a cause value or other information element indicating why the attachment is being accepted at a different access point than the one requested by the UE. For example, a cause value may indicate that the requested access point is temporary unavailable, has been permanently retired, etc. The message may or may not indicate an estimated time at which the requested access point may again be available.

In some embodiments, in conjunction with returning the Attach_Accept message, the MME (or other EPC entity) creates a context for the UE and/or performs other processing and sends other data to facilitate the UE connection to the network. The context will be associated with bearers or service data flows established for the UE.

The UE completes the connection establishment with an Attach_Complete message after the connection context is created (e.g., after a default bearer context is activated). The UE may also send other messages to the network in association with completion of the attachment, such as Activate_Default_EPS_Bearer_Context_Accept.

In some embodiments, the substitute attachment or connection may be temporary, perhaps until the UE's default or initially requested access point is again available. Illustratively, a temporary attachment may be provided with lower QoS or some other reduced level of resources in comparison to a "normal" attachment.

The network may automatically provision any attachment established as shown in FIG. 2 as a temporary attachment (with fewer resources), or may do so only for selected attachments. For example, if the MME knows that one particular access point is only temporarily unavailable, it may provision substitute attachments that had targeted that access point as temporary ones. But, if it is unknown whether or when a second access point will return to service, substitute attachments established in place of requests for the second access point may be treated as normal attachments (with normal resource levels).

As shown in FIG. 2, the MME may later initiate a detachment procedure to detach the UE, but specify that reattachment is required or requested. In this case, the network may initiate the detachment with a Detach_Request message to cause a regular detachment (and deactivation of active bearers), but with direction to reattach (e.g., using an appropriate detach type).

The UE responds with a Detach_Accept message when it completes the detachment, and in accordance with the direction issues a new Attach_Request message. Illustratively, the new attachment may request the same initial or default access point that was originally requested but was redirected to the substitute access point. As one alternative, the network may specify (e.g., in the Detach_Request message) which access point to request, or the procedure above may be repeated to redirect the attachment to a different access point.

One of ordinary skill in the art will appreciate that by responding to an Attach_Request message with an acceptance, even though the requested access point is unavailable, the procedure described above saves processing and signaling that would otherwise be required to reject the attach request and then act on a new request for the same or a different access point. For example, the illustrated procedure eliminates the need for multiple Attach_Request messages from the UE when one or more of its known access points are unavailable, prevents multiple Attach_Reject messages from the network for a single attempted attachment, and avoids multiple authentication procedures and/or other signaling.

Figure 3:
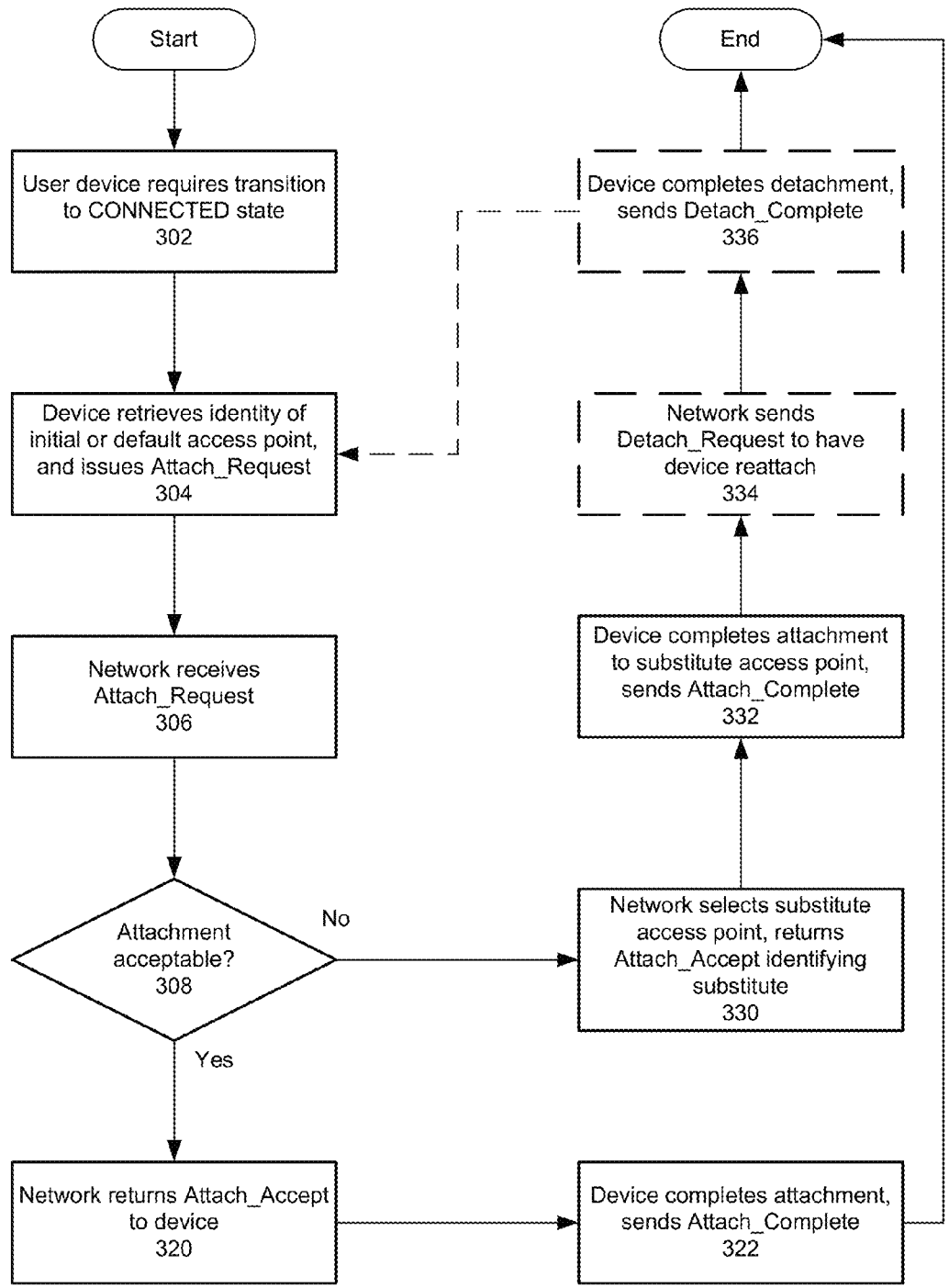
FIG. 3 is a flowchart illustrating a method of establishing a communication attachment or connection with an LTE network, in accordance with some embodiments of the present invention.

FIG. 3 is a flowchart illustrating a method of establishing a communication attachment or connection with an LTE network, in accordance with some embodiments of the present invention. Some processing and signaling that occurs between a device and the network is omitted in the interest of clarity.

In operation 302, a user device powers on, a user initiates a new or resumed data connection, or takes other action that requires the device to attach to the network.

In operation 304, the device retrieves from internal storage an identifier of a default or first access point to connect to, issues an Attach_Request message to the network and identifies that access point.

In operations 306-308, the network (e.g., an MME) receives the request and determines whether the device can and should be attached to the requested access point. If the connection can proceed, the procedure continues at operation 320; otherwise, the procedure advances to operation 330.

In operation 320, the network returns an Attach_Accept message to the device and performs associated processing, such as creation of a context if one does not exist.

In operation 322, the device completes the attachment and returns an Attach_Complete message. The device may also perform other processing, perhaps to establish one or more bearers for data services to be used. After block 322, the illustrated method ends.

In operation 330, the network does not reject the attach request despite being unable to provide it. Instead, an available substitute access point that the device can use is selected and identified to the device in an Attach_Accept message. The network may also perform associated processing, such as creation of a context if one does not exist for the user or device.

In operation 332, the device completes the attachment to the substitute access point and returns an Attach_Complete message. The device may also perform other processing, perhaps to establish one or more bearers for data services to be used.

In optional operation 334, the network issues a Detach_Request to the device, with a type value or other information element indicating that the device should reattach to the network to its default/initial access point or to a specified access point.

In optional operation 336, the device detaches and sends a Detach_Complete message. The illustrated method may then end or return to operation 304 to begin the reattachment process.

Figure 4:
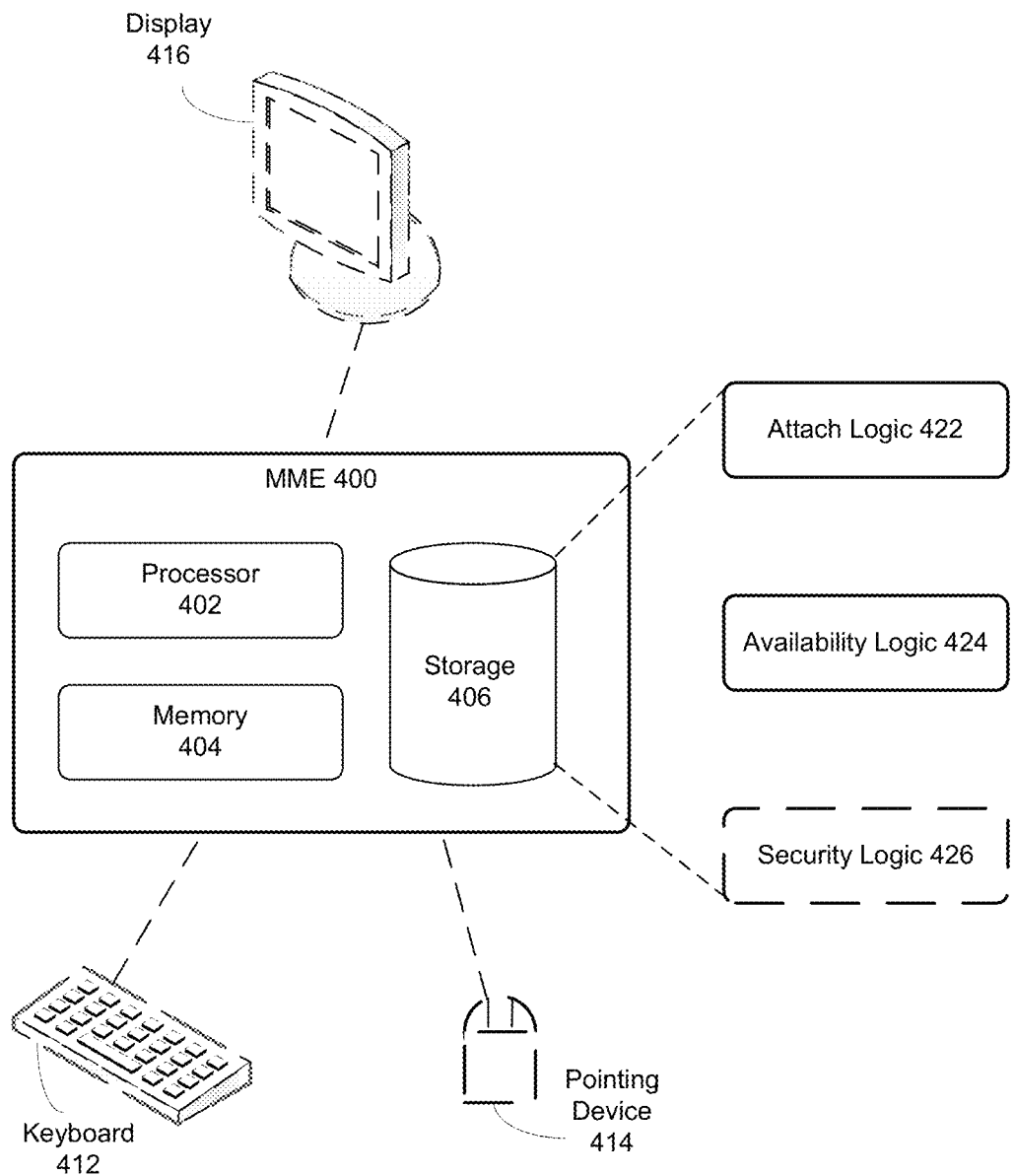
FIG. 4 is a block diagram of a Mobility Management Entity (MME) of an EPC network, according to some embodiments of the invention.

FIG. 4 is a block diagram of a Mobility Management Entity (MME) of an EPC network, according to some embodiments of the invention.

MME 400 of FIG. 4 comprises processor 402, memory 404 and storage 406, which may comprise one or more optical and/or magnetic storage components. MME 400 may be coupled (permanently or transiently) to keyboard 412, pointing device 414 and display 416.

Storage 406 of the mobility management entity stores logic that may be loaded into memory 404 for execution by processor 402. Such logic includes attach logic 422, availability logic 424 and security logic 426.

Attach logic 422 comprises processor-executable instructions for establishing, maintaining and terminating attachments between the EPC network and user equipment (and/or other entities). As described above, attach logic 422 may be executed to direct a UE to a substitute access point.

Availability logic 424 comprises processor-executable instructions for determining or monitoring availability of access points for user equipment. By executing logic 424, the MME may determine which attach requests must be redirected and identify which substitute access points they should be redirected to.

Optional security logic 426 comprises processor-executable instructions for performing security, authentication and/or other procedures. Logic 426 may thus be executed to authenticate a UE (or other entity), encrypt or decrypt a communication, verify a digital certificate, validate a message, etc.

The environment in which a present embodiment of the invention is executed may incorporate a general-purpose computer or a special-purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media, now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of establishing a connection between a device and a communication network, the method comprising:
    determining that the device needs to obtain a signaling connection with or an attachment to the communication network;
    issuing an Attach_Request message requesting a connection with the communication network, comprising a first identifier of a first access point in the communication network, wherein no other Attach_Request message has been issued from the device to the communication network since the determination;
    in response to issuing the Attach_Request message identifying the first access point, and upon the communication network determining the first access point is unavailable, receiving an Attach_Accept message comprising a second identifier of a second access point in the communication network, wherein the second access point is different than the first access point; and
    issuing an Attach_Complete message to complete connection of the device to the second access point.

2. The method of claim 1, wherein the connection is allocated fewer resources from the communication network than would a connection to the first access point.

3. The method of claim 1, wherein the Attach_Accept message comprises a cause value indicating why the first access point is unavailable.

4. A method of establishing a connection between a device and a communication network, the method comprising:
    receiving from the device an Attach_Request message requesting a connection with the communication network comprising a first identifier of a first access point in the communication network, wherein the Attach_Request message is a first Attach_Request message sent by the device after a determination that the device needs to obtain a signaling connection with or an attachment to the communication network; determining that the first access point is unavailable to the device; and in response to the Attach_Request message identifying the first access point, sending an Attach_Accept message comprising a second identifier of a second access point in the communication network instead of the first identifier of the first access point, thereby enabling the device to issue an Attach_Complete message to complete connection of the device to the second access point.

5. The method of claim 4, wherein the Attach_Accept message comprises a cause value indicating why the first access point is unavailable to the device.

6. The method of claim 4, wherein the Attach_Accept message comprises an address for the device to use when communicating with the second access point.

7. The method of claim 4, further comprising:
completing the attach of the device to the second access point with a decreased allocation of network resources in comparison to an amount of resources allocated when the device attaches to the first access point.

8. The method of claim 4, further comprising:
determining that the first access point has become available to the device; and
initiating detachment of the device from the communication network.

9. The method of claim 8, wherein initiating detachment of the device comprises issuing a message requesting the device to detach and reattach to the network.

10. The method of claim 8, further comprising:
receiving from the device another Attach_Request message requesting another connection with the communication network, and also receiving the first identifier of the first access point.

11. The method of claim 4, wherein:
the network comprises a Long Term Evolution (LTE) core network; and
the device communicates with the network via a radio access network.

12. A non-transitory computer-readable medium storing instructions that, when executed by a computer, cause the computer to perform a method of establishing a data connection between a device and a communication network, the method comprising:
receiving from the device an Attach_Request message requesting a connection with the communication network comprising a first identifier of a first access point in the communication network, wherein the Attach_Request message is a first Attach_Request message sent by the device after a determination that the device needs to obtain a signaling connection with or an attachment to the communication network;
determining that the first access point is unavailable to the device; and
in response to the Attach_Request message identifying the first access point, sending an Attach_Accept message comprising a second identifier of a second access point in the communication network instead of the first identifier of the first access point, thereby enabling the device to issue an Attach_Complete message to complete connection of the device to the second access point.

13. A system for facilitating communication between a first device and one or more packet data services, the system comprising:
one or more packet data network gateways configured to offer devices, including the first device, access to packet data services;
a serving gateway configured to receive an Attach_Request message from the first device to attach to a first access point configured to provide access to a first packet data service, wherein the Attach_Request message is a first Attach_Request message sent by the first device after a determination that the first device needs to obtain a signaling connection with or an attachment to one or more packet data network gateways; and
a mobility management entity configured to determine whether the first access point is available to the device;
wherein when the mobility management entity determines that the first access point is unavailable to the device, the mobility management entity responds to the Attach_Request message identifying the first access point with an Attach_Accept message that identifies a second access point instead of the first access point, thereby enabling the first device to issue an Attach_Complete message to complete connection of the device to the second access point.

14. The system of claim 13, wherein the second access point also provides access to the first packet data service.

15. The system of claim 13, wherein the device communicates with the apparatus via a radio access network.

16. An apparatus for facilitating communication between a mobile communication device and one or more packet data services via a radio access network, the apparatus comprising:
a processor;
attachment logic executable by the processor to:
receive from the mobile communication device an attach request identifying a first access point for accessing a first packet data service, wherein the attach request is a first attach request sent by the mobile communication device after a determination that the mobile communication device needs to obtain a signaling connection with or an attachment to the radio access network;
determine that the first access point is unavailable for the mobile communication device; and
in response to the attach request identifying the first access point, send an attach acceptance for a second access point for accessing the first packet data service, thereby enabling the mobile communication device to complete a connection of the device to the second access point; and
availability logic executable by the processor to determine the availability of the first access point and the second access point.

17. The apparatus of claim 16, wherein the attachment logic is further executable by the processor to:
complete the attach of the mobile communication device to the second access point; and
allocate to the attach to the second access point fewer resources than would be allocated if the mobile communication device were attached to the first access point.

18. The apparatus of claim 16, wherein the attachment logic is further executable by the processor to initiate a detach of the mobile communication device.

* * * * *